US010637580B2

(12) United States Patent
Dolgin et al.

(10) Patent No.: US 10,637,580 B2
(45) Date of Patent: Apr. 28, 2020

(54) BALANCED OPTICAL RECEIVERS AND METHODS FOR DETECTING FREE-SPACE OPTICAL COMMUNICATION SIGNALS

(71) Applicant: RAYTHEON COMPANY, Waltham, MA (US)

(72) Inventors: Benjamin P. Dolgin, Alexandria, VA (US); Gary M. Graceffo, Burke, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/367,574

(22) Filed: Mar. 28, 2019

(65) Prior Publication Data

US 2019/0305853 A1    Oct. 3, 2019

Related U.S. Application Data

(60) Provisional application No. 62/649,232, filed on Mar. 28, 2018.

(51) Int. Cl.
*H04B 10/00* (2013.01)
*H04B 10/61* (2013.01)
(Continued)

(52) U.S. Cl.
CPC ............ *H04B 10/614* (2013.01); *G02F 1/09* (2013.01); *H04B 10/071* (2013.01); *H04B 10/11* (2013.01);
(Continued)

(58) Field of Classification Search
CPC ... H04B 10/1129; H04B 10/614; H04J 14/06; G02B 6/02114; G02B 6/02138
See application file for complete search history.

(56) References Cited

U.S. PATENT DOCUMENTS 6,243,200 B1 * 6/2001 Zhou .................. G02B 6/29302
359/484.07
7,738,798 B2 6/2010 Mayer et al.
(Continued)

FOREIGN PATENT DOCUMENTS

EP        1686707 A2    8/2006

OTHER PUBLICATIONS

Merimaa et al. "Portable laser frequency standard at 633 nm with compact external-cavity diode laser", Metrologia (2001) vol. 38, pp. 311-318.
(Continued)

*Primary Examiner* — Tanya T Motsinger
(74) *Attorney, Agent, or Firm* — Lando & Anastasi LLP (57) ABSTRACT

Optical receivers and methods for balanced signal detection using an optical resonator. An example of an optical receiver includes a polarizing beamsplitter that receives a free-space optical signal, a first detector positioned to receive the free-space optical signal with the first polarization, an alignment system configured to rotate either the optical receiver about the optical axis or a polarization of the free-space optical signal, a faraday rotator configured to rotate the polarization of the free-space optical signal, an optical resonator that receives the free-space optical signal from the faraday rotator and accumulates resonant optical signal energy, the optical resonator configured to transmit first output optical signal energy and reject second output optical signal energy, the optical resonator being configured to convert a modulation of the free-space optical signal into an intensity modulation of the first and second output optical signal energies, a second detector that receives the first output optical signal energy and detects the intensity modulation of the first output optical signal energy, and a third
(Continued)

detector that receives the second output optical signal energy.

20 Claims, 4 Drawing Sheets

(51) Int. Cl.
| | |
|---|---|
| *G02F 1/09* | (2006.01) |
| *H04B 10/071* | (2013.01) |
| *H04B 10/11* | (2013.01) |
| *H04B 10/54* | (2013.01) |
| *H04B 10/67* | (2013.01) |

(52) U.S. Cl.
CPC ......... *H04B 10/541* (2013.01); *H04B 10/677* (2013.01)

(56) References Cited

U.S. PATENT DOCUMENTS

| | | | |
|---|---|---|---|
| 8,554,085 B1 | 10/2013 | Yap et al. | |
| 8,908,187 B2* | 12/2014 | Strandjord | G01C 19/727 |
| | | | 356/459 |
| 9,018,575 B2 | 4/2015 | Kowalevicz et al. | |
| 9,115,994 B2 | 8/2015 | Strandjord et al. | |
| 9,165,963 B2 | 10/2015 | Kowalevicz et al. | |
| 9,171,219 B2 | 10/2015 | Kowalevicz | |
| 9,400,414 B2 | 7/2016 | Kowalevicz | |
| 9,503,660 B2 | 11/2016 | Kowalevicz et al. | |
| 9,535,245 B1 | 1/2017 | Kowalevicz | |
| 9,684,127 B2 | 6/2017 | Qi et al. | |
| 9,823,075 B2* | 11/2017 | Yao | G01J 4/04 |
| 9,876,580 B2 | 1/2018 | Yuan et al. | |
| 9,887,779 B2 | 2/2018 | Kowalevicz | |
| 9,905,999 B2 | 2/2018 | Li et al. | |
| 9,973,281 B2 | 5/2018 | Kowalevicz et al. | |
| 10,164,765 B2 | 12/2018 | Dolgin et al. | |
| 10,177,856 B2 | 1/2019 | Kowalevicz et al. | |
| 10,205,526 B2 | 2/2019 | Kowalevicz | |
| 10,225,020 B2 | 3/2019 | Dolgin et al. | |
| 10,243,670 B2 | 3/2019 | Kowalevicz et al. | |
| 10,243,673 B2 | 3/2019 | Dolgin et al. | |
| 10,250,292 B2 | 4/2019 | Graceffo et al. | |
| 10,256,917 B2 | 4/2019 | Dolgin et al. | |
| 10,305,602 B2 | 5/2019 | Dolgin et al. | |
| 10,313,022 B2 | 6/2019 | Dolgin et al. | |
| 10,415,971 B2* | 9/2019 | Krueger | G01C 19/722 |
| 2005/0225775 A1 | 10/2005 | Brunfeld et al. | |
| 2005/0265728 A1* | 12/2005 | Yao | H04J 14/06 |
| | | | 398/152 |
| 2006/0013591 A1 | 1/2006 | Rohde | |
| 2006/0023987 A1* | 2/2006 | Yao | G01J 4/00 |
| | | | 385/11 |
| 2008/0054160 A1* | 3/2008 | Yao | G02B 27/283 |
| | | | 250/205 |
| 2008/0079947 A1* | 4/2008 | Sanders | G01C 19/727 |
| | | | 356/461 |
| 2008/0226300 A1 | 9/2008 | Mayer et al. | |
| 2008/0310789 A1* | 12/2008 | Mihailov | G02B 6/02114 |
| | | | 385/10 |
| 2010/0073681 A1* | 3/2010 | Qiu | G01C 19/721 |
| | | | 356/460 |
| 2012/0307253 A1* | 12/2012 | Sanders | G01C 19/727 |
| | | | 356/461 |
| 2014/0369699 A1 | 12/2014 | Strandjord et al. | |
| 2015/0236784 A1 | 8/2015 | Vahala et al. | |
| 2015/0241278 A1 | 8/2015 | Holczer | |
| 2016/0047655 A1* | 2/2016 | Qiu | G01C 19/727 |
| | | | 356/461 |
| 2016/0116288 A1* | 4/2016 | Song | G01C 19/727 |
| | | | 356/461 |
| 2016/0352515 A1 | 12/2016 | Bunandar et al. | |
| 2017/0346564 A1* | 11/2017 | Wiswell | H04B 10/118 |
| 2018/0054259 A1 | 2/2018 | Kowalevicz et al. | |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |
| 2018/0091232 A1 | 3/2018 | Dolgin et al. | |
| 2018/0102853 A1 | 4/2018 | Dolgin et al. | |
| 2018/0145765 A1 | 5/2018 | Kowalevicz et al. | |
| 2018/0167145 A1 | 6/2018 | Dolgin et al. | |
| 2018/0234231 A1 | 8/2018 | Dolgin et al. | |
| 2018/0270010 A1* | 9/2018 | Troeltzsch | H04B 10/118 |
| 2018/0313642 A1 | 11/2018 | Dolgin et al. | |
| 2018/0367223 A1 | 12/2018 | Graceffo et al. | |
| 2018/0372517 A1* | 12/2018 | Yao | G01D 5/34792 |
| 2019/0007091 A1 | 1/2019 | Graceffo et al. | |
| 2019/0017824 A1 | 1/2019 | Qiu et al. | |
| 2019/0158208 A1 | 5/2019 | Dolgin et al. | |
| 2019/0219396 A1* | 7/2019 | Krueger | G01C 19/722 |

OTHER PUBLICATIONS

"Application Note: Variable Attenuator for Lasers", Technology and Applications Center, Newport Corporation (2006).

* cited by examiner

BALANCED OPTICAL RECEIVERS AND METHODS FOR DETECTING FREE-SPACE OPTICAL COMMUNICATION SIGNALS

CROSS-REFERENCE TO RELATED APPLICATIONS

This application claims the benefits under 35 U.S.C. § 119(e) and PCT Article 8 of co-pending U.S. Provisional Application No. 62/649,232 filed on Mar. 28, 2018 and titled "BALANCED OPTICAL RECEIVERS AND METHOD FOR DETECTING FREE-SPACE OPTICAL COMMUNICATION SIGNALS," which is herein incorporated by reference in its entirety for all purposes.

BACKGROUND

Many optical communication systems manipulate light waves to carry information. For instance, often a light source (e.g., a laser source) is modulated to change one or more properties of emitted light, such as an amplitude, phase, or frequency, to convey information. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, from which the underlying signal and the information may be recovered.

SUMMARY OF INVENTION

Aspects and embodiments are directed to methods and apparatus for balanced detection of optical signals in an optical receiver using one or more optical resonators for modulation conversion.

According to one embodiment, an optical receiver comprises a polarizing beamsplitter positioned along an optical axis to receive a free-space optical signal, the polarizing beamsplitter being configured to direct light having a first polarization along a first optical path and to direct light having a second polarization, orthogonal to the first polarization, along a second optical path, a first detector positioned along the first optical path to receive the free-space optical signal when the free-space optical signal has the first polarization, and an alignment system configured to rotate either the optical receiver about the optical axis or a polarization of the free-space optical signal such that the free-space optical signal is directed along the second optical path. The optical receiver further comprises a faraday rotator positioned along the second optical path and configured to rotate the polarization of the free-space optical signal, an optical resonator configured to receive the free-space optical signal from the faraday rotator and to accumulate resonant optical signal energy, the optical resonator being configured to transmit first output optical signal energy from the optical resonator and reject second output optical signal energy from the optical resonator, wherein in response to a variation in the free-space optical signal corresponding to a modulation of the free-space optical signal, the optical resonator is configured to disrupt the first output optical signal energy and the second output optical signal energy to convert the modulation of the free-space optical signal into an intensity modulation of the first output optical signal energy and the second output optical signal energy, a second detector positioned to receive the first output optical signal energy and detect the intensity modulation of the first output optical signal energy, and a third detector positioned to receive the second output optical signal energy.

In one example, the faraday rotator is further positioned to receive the second output optical signal energy from the optical resonator, and further configured to rotate a polarization of the second output optical signal energy. The faraday rotator may be further configured to direct the second output optical signal energy to the polarizing beamsplitter, and wherein the polarizing beamsplitter is configured to direct the second output optical signal energy to the third detector. In one example, the faraday rotator is configured to rotate the polarization of the free-space optical signal by 45 degrees, and configured to rotate the polarization of the second output optical signal energy by 45 degrees.

In another example, the optical resonator includes a first semi-reflective surface and a second semi-reflective surface and is configured to accumulate the resonant optical signal energy by reflecting at least a portion of the free-space optical signal between the first and second semi-reflective surfaces.

In certain examples, the free-space optical signal is one of a phase-modulated optical signal, a frequency-modulated optical signal, and an amplitude-modulated optical signal, and wherein the variation corresponds to a respective phase, frequency, or amplitude change in the free-space optical signal.

In one example, the optical receiver is configured to use an average value of the second output optical signal energy detected by the third detector as a trigger threshold for detection of the intensity modulation of the first output optical signal energy by the second detector.

According to another embodiment, an optical receiver comprises a first polarizing beamsplitter configured to receive a free-space optical signal and split the free-space optical signal into a first polarization component having a first polarization and a second polarization component having a second polarization, the first polarization being orthogonal to the second polarization, wherein the first polarizing beamsplitter is configured to direct the first polarization component along a first optical path and direct the second polarization component along a second optical path, a first faraday rotator positioned along the second optical path and configured to receive the second polarization component, the first faraday rotator being configured to rotate the second polarization of the second polarization component, and a first optical resonator configured to receive the second polarization component from the first faraday rotator and to accumulate first resonant optical signal energy, the first optical resonator being configured to transmit first output optical signal energy and reject second output optical signal energy, wherein in response to a variation in the second polarization component corresponding to a modulation of the free-space optical signal, the first optical resonator is configured to disrupt the first output optical signal energy and the second output optical signal energy to convert the variation in the second polarization component to an intensity modulation of the first output optical signal energy and the second output optical signal energy. The optical receiver further comprises a first detector positioned to receive the first output optical signal energy and detect the variation in the second polarization component, a second detector positioned to receive the second output optical signal energy, and a second faraday rotator configured to receive the first polarization component and rotate the first polarization of the first polarization component. The optical receiver further comprises a second optical resonator configured to receive the first polarization component from the second faraday rotator and to accumulate second resonant optical signal energy, the second optical resonator being configured to transmit third output optical signal energy and reject fourth output optical signal energy, wherein in response to a variation in the first polarization component corresponding to the modulation of the free-space optical signal, the second optical resonator is configured to disrupt the third output optical signal energy and the fourth output optical signal energy to convert the variation in the first polarization component into an intensity modulation of the third output optical signal energy and the fourth output optical signal energy, a third detector positioned to receive the third output optical signal energy and detect the variation in the first polarization component, and a fourth detector positioned to receive the fourth output optical signal energy.

In one example, the optical receiver further comprises a second polarizing beamsplitter positioned along the first optical path to receive the first polarization component, wherein the second polarizing beamsplitter is configured to direct the first polarization component to the second faraday rotator. In one example, the first faraday rotator is further positioned to receive the second output optical signal energy from the first optical resonator, and further configured to rotate a polarization of the second output optical signal energy. In another example, the first faraday rotator is further configured to direct the second output optical signal energy to the first polarizing beamsplitter, and wherein the first polarizing beamsplitter is configured to direct the second output optical signal energy to the second detector. In another example, the second faraday rotator is further positioned to receive the fourth output optical signal energy from the second optical resonator, wherein the second faraday rotator is further configured to rotate a polarization of the fourth output optical signal energy, and wherein the second polarizing beamsplitter is configured to direct the fourth output optical signal energy to the fourth detector. In one example, the first faraday rotator is configured to rotate the second polarization of the second polarization component by 45 degrees, and configured to rotate the polarization of the second output optical signal energy by 45 degrees.

In another example, the first optical resonator includes a first semi-reflective surface and a second semi-reflective surface and is configured to accumulate the first resonant optical signal energy by reflecting at least a portion of the second polarization component between the first and second semi-reflective surfaces.

In another example, the free-space optical signal is one of a phase-modulated optical signal, a frequency-modulated optical signal, and an amplitude-modulated optical signal, and wherein the variation in the first polarization component or the variation in the second polarization component corresponds to a respective phase, frequency, or amplitude change in the free-space optical signal.

According to another embodiment, a method of operating an optical receiver comprises receiving, along an optical axis at a polarizing beamsplitter, a free-space optical signal having a polarization, at the polarizing beamsplitter, directing the free-space optical signal along a first optical path when the polarization of the free-space optical signal is a first polarization, and directing the free-space optical signal along a second optical path when the polarization of the free-space optical signal is a second polarization that is orthogonal to the first polarization, receiving the free-space optical signal at a first detector positioned along the first optical path when polarization of the free-space optical signal is the first polarization, and rotating either the optical receiver about the optical axis or a polarization of the free-space optical signal such that the free-space optical signal is directed along the second optical path. The method further comprises rotating the polarization of the free-space optical signal at a faraday rotator positioned along the second optical path, receiving the free-space optical signal from the faraday rotator at an optical resonator and accumulating resonant optical signal energy within the optical resonator, disrupting first output optical signal energy emitted from the optical resonator and second output optical signal energy rejected from the optical resonator in response to a variation in the free-space optical signal corresponding to a modulation of the free-space optical signal to convert the modulation of the free-space optical signal into an intensity modulation of the first and second output optical signal energies, receiving the first output optical signal energy at a second detector, and detecting the intensity modulation of the first output optical signal energy, and receiving the second output optical signal energy at a third detector.

In one example, the method further comprises receiving the second output optical signal energy rejected from the optical resonator at the faraday rotator, rotating a polarization of the second output optical signal energy and directing the second output optical signal energy to the polarizing beamsplitter with the faraday rotator, and directing the second output optical signal energy to the third detector with the polarizing beamsplitter.

In another example, accumulating the resonant optical signal energy within the optical resonator includes reflecting at least a portion of the free-space optical signal between a first semi-reflective surface and a second semi-reflective surface.

In another example, the free-space optical signal is one of a phase-modulated optical signal, a frequency-modulated optical signal, and an amplitude-modulated optical signal, and wherein the variation corresponds to a respective phase, frequency, or amplitude change in the free-space optical signal.

In one example, the method further comprises detecting an average value of the second output optical signal energy, and using the average value of the second output optical signal energy as a trigger threshold for detection of the intensity modulation of the first output optical signal energy.

Still other aspects, embodiments, and advantages of these exemplary aspects and examples are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and examples described herein may also include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Various aspects and examples described herein are directed to balanced free-space optical signal receivers and methods for demodulating a free-space polarized optical signal. In certain examples, an optical receiver may be positioned to receive a free-space optical signal having an unknown polarization. One or more components of the optical receiver are configured to rotate either the optical receiver or the polarization of the incoming free-space optical signal such that a polarizing beamsplitter directs the received free-space optical signal along a selected optical path to an optical resonator, such as a Fabry-Perot resonator. In particular, the optical receiver or the polarization of the incoming optical signal may be rotated such that the polarization of the received free-space optical signal is better aligned with an optical transmission axis or optical reflection axis of the polarizing beamsplitter. The optical resonator is configured to convert the encoded (e.g., phase-, frequency-, or amplitude-modulated) free-space optical signal into an intensity-encoded output.

In certain other examples, an optical receiver may be positioned to receive a free-space optical signal having a dual-polarization. The described optical receiver may include a polarizing beamsplitter that is configured to direct a polarization component of the free-space optical signal having a first polarization to a first optical resonator, and direct a second polarization component of the free-space optical signal having a second polarization to a second optical resonator. Each of the first and second optical resonators are configured to convert the received polarization component of the free-space optical signal into an intensity-encoded output.

The optical resonators described herein may be configured to accumulate resonant optical signal energy therein and transmit and reject (also referred to as reflect) output optical signal energy. In response to a variation (e.g., a phase, frequency, or amplitude modulation) in the received free-space optical signal (or a component thereof), the received free-space optical signal disrupts the optical resonance within the optical resonator and causes a disruption in both the transmitted output optical signal energy and the rejected output optical signal energy while resonance is re-established within the optical resonator.

Accordingly, in various examples, the optical receivers described herein include a plurality of detectors, at least one detector for the transmitted output optical signal energy and at least one detector for the rejected output optical signal energy. Balanced detection of the transmitted output optical signal energy and the rejected output optical signal energy improves the sensitivity of the optical receiver when compared to single sensing resonator output techniques. In some instances, balanced detection, as discussed herein, may result in a 3 dB (or more) sensitivity improvement relative to single sensing resonator output techniques. As used herein the term "balanced" detection or detecting is intended to refer to an approach where one or more detectors are used to detect both the transmitted output optical signal energy and the rejected output optical signal energy and is not intended to be limiting with respect to any characteristics of the transmitted output optical signal energy and the rejected output optical signal energy. The transmitted output optical signal energy and the rejection output optical signal are not necessarily equal in amplitude or shape and opposite in sign. The transmitted output optical signal energy and the rejected output optical signal energy may have similar or differing envelope shapes and may have similar of differing amplitudes and/or phase.

It is to be appreciated that embodiments of the apparatuses and methods discussed herein are not limited in application to the details of construction and the arrangement of components set forth in the following description or illustrated in the accompanying drawings. The apparatuses and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatuses and methods or their components to any one positional or spatial orientation.

Figure 1:
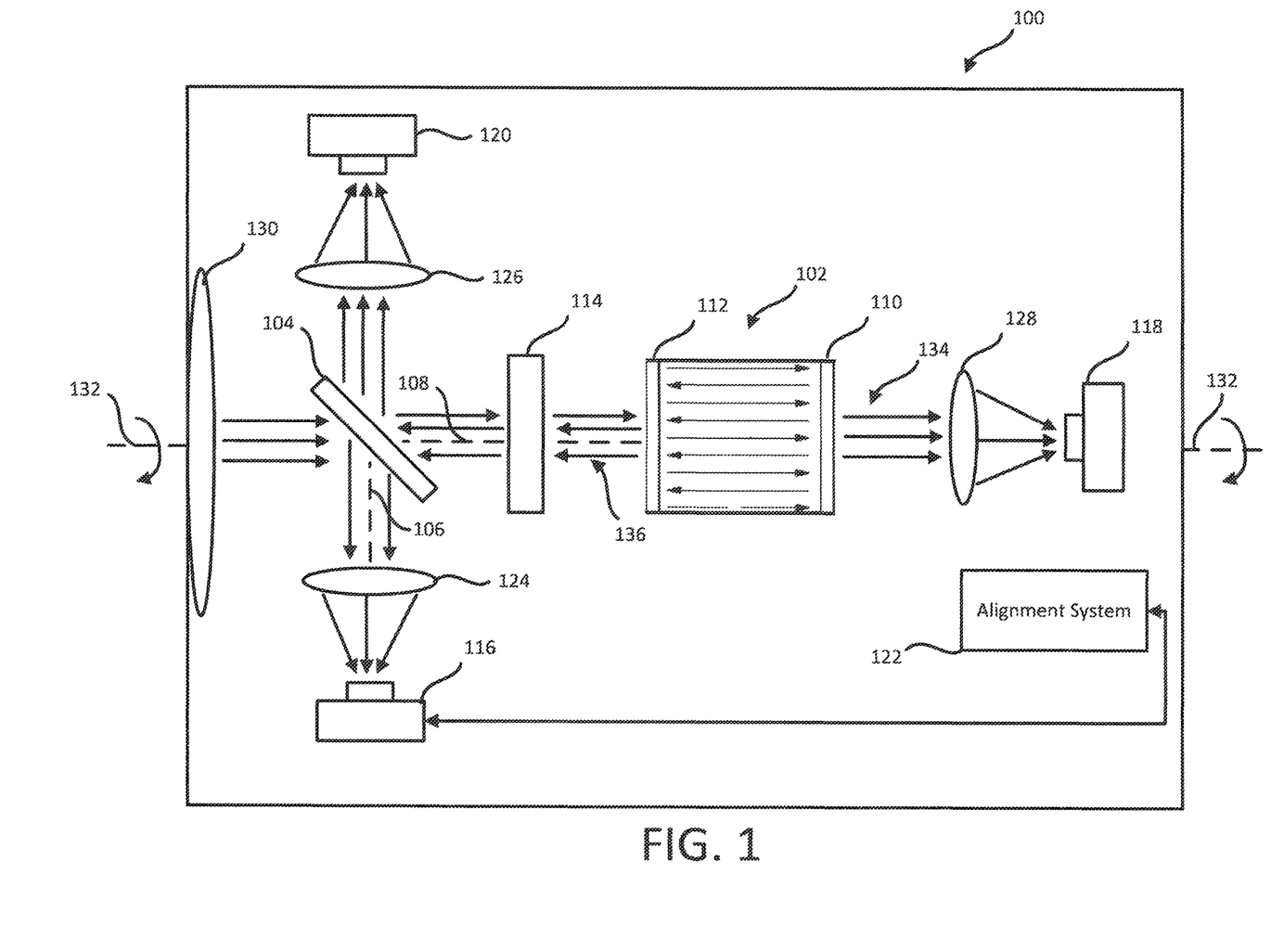
FIG. 1 is a diagram of one example of an optical receiver according to aspects of the present invention.

FIG. 1 illustrates one example of an optical receiver 100 according to various examples described herein. As illustrated, the optical receiver 100 may include a polarizing beamsplitter 104, a faraday rotator 114, an alignment system 122, an optical resonator 102 having more than one output, and a plurality of detectors. In particular, FIG. 1 shows the optical receiver 100 including three detectors 116, 118, 120. As further illustrated, the optical receiver 100 may include various optical elements (e.g., shown as lenses 124, 126, 128) for directing and/or focusing light on one of the illustrated detectors 116, 118, 120. The optical receiver 100 is further shown as including an entrance aperture 130 (e.g., shown as a lens). The entrance aperture 130 is positioned to receive a free-space optical signal, and direct the free-space optical signal to the polarizing beamsplitter 104. While shown as including a single lens, in various examples, a plurality of mirrors or lenses may be positioned at the entrance aperture 130 to collect, direct, and/or focus the free-space optical signal at the polarizing beamsplitter 104. For instance, an objective lens or objective lens assembly may form the entrance aperture 130. The entrance aperture 130 and the polarizing beamsplitter 104 may be centered about an optical axis along which the free-space optical signal is received. The optical axis is illustrated as line 132 in FIG. 1. The free-space optical signal may primarily consist of non-ionizing electromagnetic radiation.

As discussed herein, the free-space optical signal may have one or more linear polarizations. In some instances, the one or more polarizations may be unknown when received at the optical receiver 100. For instance, a first polarization of the free-space optical signal may be a vertical polarization, and a second polarization of the free-space optical signal may be a horizontal polarization. Accordingly, a first polarization of the free-space optical signal may be orthogonal to a second polarization of the free-space optical signal. In other examples, the free-space optical signal may have a single polarization. It is appreciated that the vertical and horizontal polarizations are merely described herein as examples and are not intended to be limiting. That is, in other examples, the vertical and horizontal polarizations may be switched, and may include other orthogonal polarizations.

As illustrated in FIG. 1, the polarizing beamsplitter 104 is positioned along the optical axis to receive the free-space optical signal. The polarizing beamsplitter 104 may be configured to direct light having a first polarization along a first optical path 106 and to direct light having a second polarization along a separate second path 108. For instance, as illustrated, the polarizing beamsplitter 104 has a transmit axis aligned with the second optical path 108, and a reflect axis aligned with the first optical path 106. In other examples, the transit axis and reflect axis may be switched. When the received free-space optical signal has the second polarization, the free-space optical signal is directed (e.g., transmitted) by the polarizing beamsplitter 104 along the transmit axis, and therefore, along the second optical path 108 to the faraday rotator 114. However, when the received free-space optical signal has the first polarization, the free-space optical signal is directed (e.g., reflected) by polarizing beamsplitter 104 along the reflect axis, and therefore, along the first optical path 106 to the first detector 116 (e.g., via the lens 124).

As previously discussed, in some situations the received free-space optical signal may have an unknown polarization. In such situations, it may be the case that the unknown polarization is not partially or entirely aligned with the transmit axis of the polarizing beamsplitter 104. Accordingly, in various examples, the alignment system 122 may reposition the optical receiver 100, and in particular the polarizing beamsplitter 104, such that the polarization of the received free-space optical signal is better aligned with the transmit axis of the polarizing beamsplitter 104. In other examples, the alignment system 122 may include an optical element, such as a waveplate, configured and positioned to rotate the polarization of the incoming optical signal such that the polarization of the received free-space optical signal is better aligned with the transmit axis of the polarizing beamsplitter 104. Such operation also improves the efficiency of the optical receiver 100.

As discussed above, the polarizing beamsplitter 104 is configured to direct the received free-space optical signal along the first optical path 106 if the free-space optical signal has a first polarization, and direct the received free-space optical signal along the second optical path 108 if the free-space optical signal has a second polarization. When directed along the first optical path 106, the free-space optical signal is received at the lens 124, and directed to the first detector 116. In various examples, the first detector 116 is used as a power meter to determine the strength of the impinging free-space optical signal. As illustrated in FIG. 1, the first detector 116 is coupled to the alignment system 122. The alignment system 122 may include one or components configured to displace the optical receiver 100, or displace one or more components of the optical receiver 100. For instance, the alignment system 122 may be configured to rotate the optical receiver 100 about the optical axis (e.g., rotation about the line 132). In other example, the alignment system 122 may include an optical element, such as a half-waveplate to rotate the polarization of the incoming free-space optical signal. One direction of rotation about the optical axis is illustrated in FIG. 1. The alignment system 122 may include a mechanical actuator or an electric actuator, to name a few examples. For instance, the alignment system 122 may include an electric motor that converts electrical energy into a mechanical torque to rotate the optical receiver 100 about the optical axis. In various other examples, the alignment system 122 may include, or may be coupled with, processing circuitry that controls the alignment system 122.

At least the first detector 116 and alignment system 122 operate as a feedback loop to rotate the optical receiver 100 to better align the polarization of the free-space optical signal with the transmit axis of the polarizing beamsplitter 104. In various examples, the alignment system 122 rotates the optical receiver 100 (or the polarization of the incoming optical signal) to reduce the strength of the free-space optical signal when it is received at the first detector 166. In various examples, rotation of the optical receiver 100 about the optical axis may be within the range of 0 degrees to 90 degrees, relative to an initial position of the optical receiver 100. Accordingly, operation of the first detector 116 and the alignment system 122 ensures that a majority (or all) of the free-space optical signal energy is directed along the second optical path 108 in the direction of the optical resonator 102, despite having an initially unknown polarization.

The faraday rotator 114 is interposed between the polarizing beamsplitter 104 and the optical resonator 102 along the second optical path 108. The faraday rotator 114 is configured to rotate the polarization of the free-space optical signal received along the second path 108. In various examples, the faraday rotator 114 rotates the free-space optical signal by a predetermined angle, such as 45 degrees. In certain other examples, the faraday rotator 114 may be replaced with another suitable polarization rotator. As illustrated in FIG. 1, the faraday rotator 114 directs the free-space optical signal to the optical resonator 102.

The optical resonator 102 is positioned to receive the free-space optical signal from the faraday rotator along the second optical path 108. In various examples, the optical resonator 102 is an optical component capable of sensing variations, such as phase variations, amplitude variations, or frequency variations in the received free-space optical signal. In particular, the optical resonator 102 is configured to transform the variations in the free-space optical signal into an intensity modulation of transmitted output optical signal energy (also described herein as the first output optical signal energy), and/or an intensity modulation of rejected output optical signal energy (also described herein as the second output optical signal energy). In particular, the optical resonator 102 is configured to accumulate resonant optical signal energy within the optical resonator 102 and convert the variation (e.g., phase, frequency, or amplitude modulation) of the free-space received optical signal to an intensity modulation of the first and/or second output optical signal energy, in part, by interaction of the received free-space optical signal with resonating optical signal energy within the optical resonator 102.

When a steady-state resonance condition is established within the optical resonator 102, the transmitted output optical signal energy (represented by arrow(s) 134) and the rejected output optical signal energy (represented by arrow 136) are emitted from the optical resonator 102 at steady intensities. When a variation occurs in the arriving free-space optical signal, temporarily disrupting the steady-state, the intensities of the transmitted output optical signal energy and the rejected output optical signal energy are disrupted. During successive reflections of the received free-space optical signal inside the optical resonator 102, resonance is re-established and the intensities of the transmitted output optical signal energy and the rejected output optical signal energy return to their steady-state levels. In some examples, the intensity of the transmitted output optical signal energy increases and at the same time the intensity of the rejected output optical signal energy decreases during successive reflections of the received optical signal energy inside the optical resonator 102 until steady intensities emerge when the optical resonator 102 has returned to the steady-state condition. However, in other examples, as the resonance condition is being reestablished, the intensity of the transmitted output optical signal energy decreases and the intensity of the rejected output optical signal energy increases until the steady-state values are reached. In one example, the steady-state may correspond to zero reflection (or rejection) and unity transmission, or vice versa; however, in other examples, in the steady-state both the transmitted output optical signal energy 120 and the rejected output optical signal energy 122 may have non-zero intensity values that may be the same or different from one another.

While shown as an etalon, in other examples, the optical resonator 102 may be a micro-ring or other resonant structure. That is, examples of the optical resonators described herein are not limited to the particular arrangement illustrated in FIG. 1 or FIG. 2. For instance, in one example the optical resonator 102 may instead be a micro-ring formed of one or more waveguides arranged as a closed loop such that optical signal energy traversing "around" the loop may be phase aligned with a dimension of the loop at one or more frequencies. Accordingly, optical signal energy traversing the loop may constructively interfere, at certain frequencies, to sustain the optical signal energy within the loop. At other frequencies, optical signal energy traversing the loop will interfere and thereby destroy, or reject, a build-up of optical signal energy at that frequency. The closed loop is also coupled to an input and output to allow light to enter the loop, e.g., an aperture, and to let light out of the loop.

According to certain examples, the optical resonator 102 coherently develops the transmitted output optical signal energy based on the received free-space optical signal, and maintain a given intensity level of the transmitted output optical signal energy until a variation (e.g., a phase, frequency, or amplitude change) of the received free-space optical signal occurs. When the variation occurs in the received free-space optical signal, interference causes the dependent change in the intensity (or amplitude) of the transmitted output optical signal energy. As discussed, in addition to the transmitted output optical signal energy, the optical resonator 102 may also emit the rejected output optical signal energy. The rejected output optical signal energy is emitted from the optical resonator 102 in a direction opposite the transmitted output optical signal energy, and therefore, may also be described as being "reflected" by the optical resonator 102. When the variation (e.g., phase, frequency, or amplitude change) occurs in the received free-space optical signal, the interference within the optical resonator 102 also causes a dependent change in the intensity (or amplitude) of the rejected output optical signal energy. For instance, the variation may result in a decrease in the intensity of the transmitted output optical signal energy, and an increase in the intensity of the rejected output optical signal energy, or vice versa. Accordingly, a received phase-encoded (or frequency-encoded or amplitude-encoded) free-space optical signal is converted to amplitude varying output signals by the optical resonator 102. The transmitted output optical signal energy is suitable for direct detection by a detector, and the rejected output optical signal energy is suitable for direct detection by another detector, such as the second detector 118 and third detector 120 illustrated in FIG. 1.

As discussed, in various examples, the optical resonator 102 may be used to convert phase or frequency modulations of a received free-space optical signal into intensity or amplitude modulations of the output optical signal energy. The intensity or amplitude modulated output optical signal energy may be converted to an electrical signal by a detector including a photodetector (e.g., a photodetector of the second detector 118 or a photodetector of the third detector 120), with corresponding amplitude variations representative of the variation (e.g., phase transition) of the received free-space optical signal. As illustrated in FIG. 1, in various examples, the optical resonator 102 is an etalon. That is, the optical resonator 102 may include a pair of parallel semi-reflective surfaces with an at least semi-transparent optical medium interposed there between. In various examples, the optical resonator 102 may include an interior (e.g., a cavity) that is defined by the pair of semi-reflective surfaces (e.g., shown as a first-semi reflective surface 110 and a second semi-reflective surface 112 in FIG. 1).

The first semi-reflective surface 110 is positioned in optical communication with the second semi-reflective surface 112. In FIG. 1, the first semi-reflective surface 110 is positioned substantially parallel and facing the second semi-reflective surface 112. As illustrated in FIG. 1, in various examples, each of the first and second semi-reflective surfaces 110, 112 are substantially planar. However, in other examples, other arrangements and surface curvatures may be used. An optical medium is positioned inside the optical resonator 102 and interposed between the first semi-reflective surface 110 and the second semi-reflective surface 102. In certain examples, the optical medium may be air or another dielectric material. In another example, the optical medium may be a vacuum.

The etalon may have one or more characteristic resonant frequencies, each associated with a certain wavelength of light, based upon the spacing (i.e., dimensional length) between the semi-reflective surfaces 110, 112. In some examples, the surfaces 110, 112 are semi-reflective and also semi-transmissive, in that they allow some light through. That is, in various examples, each semi-reflective surface 110, 112 may act as an input to allow ingress of the free-space optical signal, while also acting as an output to allow emission of output optical signal energy. Accordingly, the arriving free-space optical signal may be allowed into the optical resonator 102 (i.e., between the pair of semi-reflective surfaces 110, 112) and may resonate inside the optical resonator 102 and between the pair of semi-reflective surfaces 110, 112 before being emitted through each of the semi-reflective surfaces 110, 112.

In various examples, the optical resonator 102 emits first output optical signal energy, i.e., the transmitted output optical signal energy, from the first semi-reflective surface 110, and also emits second output optical signal energy, i.e., the rejected output optical signal energy, from the second semi-reflective surface 112. In the example in which the first and second semi-reflective surfaces 110, 112 define a resonant cavity, optical signal energy is emitted from both ends of the resonant cavity. As further described below, the output optical signal energy from each end of the optical cavity (e.g., the transmitted output optical signal energy and the rejected output optical signal energy) may be detected at a corresponding detector to provide a balanced detecting approach.

As described above, some of the resonating optical signal energy inside the optical resonator is emitted out of the optical resonator 102 through at least one of the semi-transmissive surfaces 110, 112. In various examples, one of the first semi-reflective surface 110 and the second semi-reflective surface 112 may form an input (shown as the second semi-reflective surface 112 in FIG. 1) through which the free-space optical signal is received from the faraday rotator 114 and directed into the inside of the optical resonator 102. The first semi-reflective surface 110 acts as a first output from which the transmitted output optical signal energy is emitted, and the second semi-reflective surface 112 acts a second output from which the rejected output optical signal energy is emitted. That is, each of the first and second semi-reflective surfaces 110, 112 allow a portion of trapped resonating optical signal energy from the interior to emerge as output optical signals.

As discussed, a change in phase, frequency, or amplitude of the arriving free-space optical signal causes a change in the intensity of the output optical signal energy (e.g., the first output optical signal energy and the second output optical signal energy). A large transition in the arriving free-space optical signal, for example, causes a large (but temporary) intensity drop in the emerging transmitted output optical signal energy and also causes a large (but temporary) intensity increase in the emerging rejected output optical signal energy, or vice versa (i.e., a large, temporary increase in the intensity of the emerging transmitted output optical signal energy and a large, temporary decrease in the intensity of the emerging rejected output optical signal energy). Similar operation occurs in a micro-ring or other optical resonator. Accordingly, in various examples, the optical resonator 102 functions as a modulation converter for the received optical signal. The emerging output optical signal energy may therefore carry the same information content as the arriving optical signal, but in an intensity modulated form.

The use of the term "etalon" throughout this disclosure is not intended to be limiting and as used herein may include any of multiple structures, including plates with reflecting surfaces as well as parallel mirrors with various materials positioned in-between, and in particular examples, with controllable optical materials positioned in-between. The spacing between the semi-reflective surfaces of an etalon may be referred to herein as a cavity, but is not so limited. That is the resonant cavities may include other structures, such interferometers and the like. Additionally, etalon structures may be formed as a laminate, layer, film, coating, or the like.

In some examples, an etalon may include reflective surfaces (including semi-reflective surfaces) that are not co-planar and/or are not co-linear. For example, an interior reflective surface of the etalon may include some curvature, and an opposing surface may also be curved such that a distance between the two surfaces is substantially constant across various regions of the optical resonator, in some examples. In other examples, the etalon may have non-linear or non-planar surfaces with varying distances between the surfaces at various regions, and may still function as an optical resonator for various wavelengths and at various regions, suitable for use in examples discussed herein. Accordingly, the optical resonator 102 of various examples may be purposefully designed to conform to a surface, or to have various regions responsive to differing wavelengths, or responsive to differing angles of arrival for a given wavelength, in certain examples.

As illustrated in FIG. 1, the optical receiver 100 may include at least a second detector 118 and a third detector 120. The intensity-modulated first output optical signal energy is directed to the second detector 118, and the intensity-modulated second output optical signal energy is directed to the third detector 120. The second detector 118 and the third detector 120 may each include an optical-electrical converter (OEC), such as a photodetector, which in certain examples is a photodiode. While shown as physically separated detectors, in other examples, the optical receiver 100 may include one or more optical elements (e.g., mirrors) that direct the first and second output optical signal energy to the same detector or different regions within a single detector. In various examples, the first detector 116, which operates as a power meter, may also include a photodetector.

The second detector 118 converts the first output optical signal energy to a first electrical signal, and the third detector 120 converts the second output optical signal energy to a second electrical signal. In particular, each detector 118, 120 produces an amplitude modulated signal representative of the corresponding received intensity-modulated output optical signal energy. Each detector 118, 120 may detect the change in the corresponding output optical signal energy intensity (e.g., based on the amplitude modulated signals) to determine the phase, frequency, or amplitude variations (modulations) in the arriving free-space optical signal. In particular, the detectors 118, 120 may include processing circuitry that perform various processes for interpreting peaks and troughs of such output signals. In some examples, each detector 118, 120 may include, or may send and receive data with, an analog to digital converter and a digital processing system. In these examples, the amplitude modulated signals representative of the intensity-modulated output optical signal energy may be converted to a digital form by the analog to digital converter. The digital signal may then be provided to a digital processing subsystem for digital processing.

As illustrated in FIG. 1, the faraday rotator 114 may be positioned along the second optical path 108 to receive the second output optical signal energy from the optical resonator 102. Similar to the received free-space optical signal, the faraday rotator 114 may rotate a polarization of the second output optical signal energy by a predetermined amount, such as 45 degrees. In various examples, the faraday rotator 114 rotates the polarization of the second output optical signal energy and the polarization of the free-space optical signal by the same amount. Accordingly, the rejected optical signal energy may undergo a 90 degree polarization rotation relative to the polarization of the free-space optical signal directed along the second optical path 108. The faraday rotator 114 directs the second output optical signal energy to the polarizing beamsplitter 104 along the second optical path 108 in a direction opposite to propagation of the free-space optical signal along the second optical path 108. The polarizing beamsplitter 104 is positioned to receive the second output optical signal energy from the faraday rotator 114 and direct the second output optical signal energy to the third detector 120.

Figure 2:
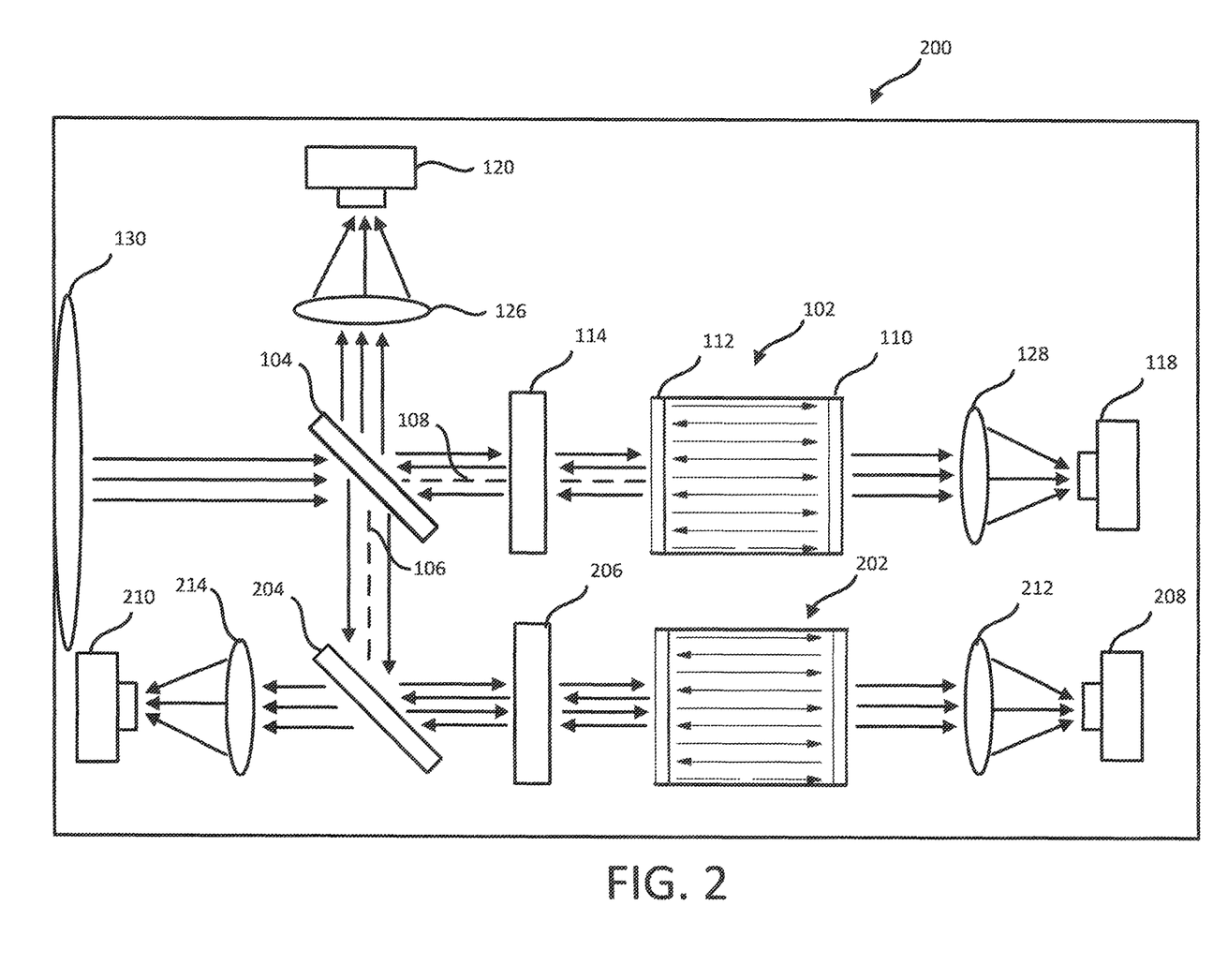
FIG. 2 is a diagram of another example of an optical receiver according to aspects of the present invention.

In various examples, the received free-space optical signal may include information encoded in more than one polarization of the free-space optical signal. In these situations, the optical receiver 100 may include a second optical resonator and a second polarizing beamsplitter in place of (or in addition to) the power meter (i.e., the first detector 116) and/or the alignment system 122. FIG. 2 illustrates one example of an optical receiver 200 including a second polarizing beamsplitter 204 and a second optical resonator 202, among other additional components. The optical receiver 200 of FIG. 2 includes many of the same components as the optical receiver 100 illustrated in FIG. 1, such as the entrance aperture 130, the polarizing beamsplitter 104 (referred to as the "first" polarizing beamsplitter 104 in FIG. 2), the faraday rotator 114 (referred to as the "first" faraday rotator 114 in FIG. 2), the optical resonator 102 (referred to as the "first" optical resonator 102 in FIG. 2), the optical detectors 118, 120, and the various optical elements (e.g., lenses 126, 128). Similar components are referred to by the same reference numbers in FIG. 2 as also shown in FIG. 1.

As illustrated FIG. 2, for received free-space optical signals having information encoded in more than one polarization, the optical receiver 200 may include a second polarizing beamsplitter 204, a second faraday rotator 206, a second optical resonator 202, and additional detectors 208, 210 and optical elements (e.g., lenses 212, 214). In response to receiving the free-space optical signal from the entrance aperture 130, the first polarizing beamsplitter 104 may split the free-space optical signal based on the polarizations thereof. In particular, the first polarizing beamsplitter 104 may split the free-space optical signal into a first polarization component that has a first linear polarization, and a second polarization component that has a second linear polarization. In such an example, the first and second polarizations may be orthogonal to one another, such as a vertical polarization and a horizontal polarization. As discussed herein, the first polarization component is a first portion of the free-space optical signal, and the second polarization is a second portion of the free-space optical signal.

As discussed above with reference to at least FIG. 1, the first polarizing beamsplitter 104 has a transmit axis positioned along the second optical path 108, and a reflect axis positioned along the first optical path 106. However, in other examples, these axes may be switched. The first polarizing beamsplitter 104 is configured to direct (e.g., reflect) the first polarization component along the reflect axis, and therefore, along the first optical path 106 to the second optical resonator 202 (e.g., via the second polarizing beamsplitter 204 and second faraday rotator 206). The first polarizing beamsplitter 104 is further configured to direct (e.g., transmit) the second polarization component along the transmit axis, and therefore along the second optical path 108, to the first optical resonator 102 (e.g., via the first faraday rotator 114).

In various examples, the first faraday rotator 114 and the first optical resonator 102 operate on the second polarization component of the free-space optical signal in a manner similar to that previously described herein with reference to FIG. 1 and the received free-space optical signal. That is, the first optical resonator 102 receives the second polarization component and accumulates the resonant optical signal energy therein. In response to a variation (e.g., a phase, frequency, or amplitude change) in the second polarization component, the first optical resonator 102 is configured to disrupt transmitted first output optical signal energy and rejected second output optical signal energy from their steady-state conditions. The first output optical signal energy, and the second output optical signal energy are detected by the detector 118 and detector 120, respectively, as also discussed above with reference to FIG. 1.

In various examples, the second polarizing beamsplitter 204, the second faraday rotator 206, and the second optical resonator 202 operate in manner similar to the first polarizing beamsplitter 104, the first faraday rotator 114, and the first optical resonator 102. As illustrated in FIG. 2, the second polarizing beamsplitter 204 receives the first polarization component from the first polarizing beamsplitter 104 along the first optical path 106, and directs the first polarization component in a direction of the second faraday rotator 206. Similar to the first polarizing beamsplitter 104, the second polarizing beamsplitter 204 has a transmit axis and a reflect axis. Light having the second polarization is directed along the transmit axis, and light having the first polarization is directed along the reflect axis. In various other examples, the transmit axis and the reflect axis of the second polarizing beamsplitter 204 may be switched.

Accordingly, the first polarization component having the first polarization is directed by the second polarizing beamsplitter 204 along the reflect axis of the second polarizing beamsplitter 204 and in a direction of the second faraday rotator 206. The second faraday rotator 206 may be similar to the first faraday rotator 114, and may rotate the first polarization of the first polarization component by a predetermined amount (e.g., 45 degrees). The first polarization component is then directed by the second faraday rotator 206 to the second optical resonator 202.

The second optical resonator 202 receives the first polarization component from the second faraday rotator 206, and similar to the first optical resonator 102, accumulates resonant optical signal energy therein based on a received optical signal, e.g., the first polarization component. In response to a variation (e.g., a phase, frequency, or amplitude change) in the first polarization component, the second optical resonator 202 is configured to disrupt transmitted output optical signal energy and rejected second output optical signal energy. In various examples, the output optical signal energy transmitted by the second optical resonator 202 is also referred to as the third output optical signal energy of the second optical resonator 202, and the output optical signal energy rejected by the second optical resonator 202 is also referred to as the fourth output optical signal energy of the second optical resonator 202. The transmitted third output optical signal energy and the rejected fourth output optical signal energy are detected by the detector 208 and the detector 210, respectively.

As illustrated in FIG. 2, the fourth output optical signal energy is directed from the second optical resonator 202 to the second faraday rotator 206. The second faraday rotator 206 rotates a polarization of the fourth output optical signal energy, and directs the fourth output optical signal energy to the second polarizing beamsplitter 204. In various examples, the second faraday rotator 206 rotates the first polarization of the first polarization component and the polarization of the rejected output optical signal energy by the same amount (e.g., 45 degrees). Accordingly, the rejected output optical signal energy of the second optical resonator 202 may undergo a 90 degree polarization rotation and therefore be aligned with the transmit axis of the second polarizing beamsplitter 204. The second polarizing beamsplitter 204 then directs the fourth output optical signal energy to the corresponding detector 210.

The detectors 208, 210 may operate similar to the detectors 118, 120 described herein with reference to FIG. 1. In particular, the detector 208 may receive the third output optical signal energy (e.g., the transmitted output optical signal energy from the second optical resonator 202), and the detector 210 may receive the fourth output optical signal energy (e.g., the rejected output optical signal energy from the second optical resonator 202). Each detector 208, 210 may detect the change in the corresponding output optical signal energy intensity to determine the phase, frequency, or amplitude variations (modulations) in the arriving free-space optical signal, as previously discussed herein.

Accordingly, the first and second polarizing beamsplitters 104, 204 allow the optical receiver 200 to operate on orthogonal polarizations of the received free-space optical signal simultaneously. Since the two polarizations are orthogonal, the corresponding information is non-interfering and may be demodulated independently and according to the techniques described herein. In some examples, the principle axis of the received free-space optical signal is not aligned with an orientation (i.e., the axes) of the first polarizing beamsplitter 104. As a result, each of the detectors 118, 120, 208, 210 may receive a portion of both polarization components of the received free-space optical signal. Moreover, in some examples, the detectors 208, 210 may be coupled to an alignment system, such as the alignment system 122 shown in FIG. 1, to rotate the optical receiver 200 or the polarization of the incoming free-space optical signal to better align the principle axes of the received free-space optical signal with the transmit axis and reflect axis of the first polarizing beamsplitter 104. In other examples, a digital signal processor (as may be included in examples of the optical receivers 100, 200) may be programmed with algorithms to decompose the two mixed polarizations into individual components without requiring rotation of either the polarization of the incoming free-space optical signal or components of the optical receiver 200.

Figure 3:
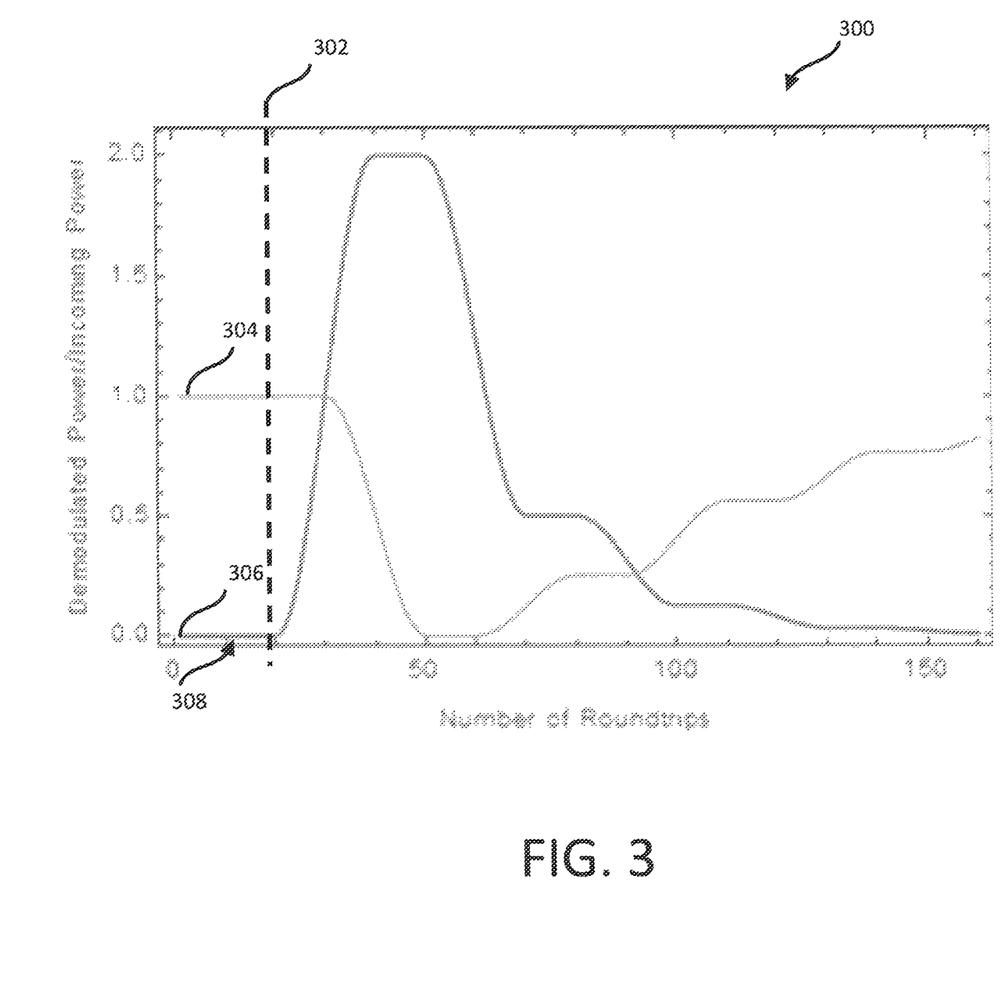
FIG. 3 is a graph showing an example of an output power plot of transmitted output optical signal energy and rejected output optical signal energy emitted from an optical resonator in response to modulation of a received optical signal according to aspects of the present invention.

As discussed above with reference to at least FIGS. 1 and 2, in various examples, the described optical resonators 102, 202 accumulate resonant optical signal energy and coherently develop the transmitted output optical signal energy and rejected optical signal energy based on the received free-space optical signal, and maintain a given intensity level of each of the transmitted output optical signal energy and the rejected optical signal energy until a variation (e.g., a phase, frequency, or amplitude change) of the received free-space optical signal (or a polarization component thereof) occurs. When a variation occurs in the received free-space optical signal (or a polarization component thereof), interference causes dependent changes in the intensity (or amplitude) of the corresponding transmitted output optical signal energy and rejected output optical signal energy. FIG. 3 illustrates an output power plot 300 of the transmitted output optical signal energy and the rejected output optical signal energy of the first optical resonator 102 in response to a variation (e.g., phase transition) in the received free-space optical signal. The second optical resonator 202 may operate in a similar manner. In FIG. 3, a first trace 304 represents the transmitted output optical signal energy, and a second trace 306 represents the rejected output optical signal energy of the first optical resonator 102. FIG. 3 is described with continuing reference to FIG. 1 and FIG. 2. FIG. 3 illustrates an example in which the optical resonator 102 is tuned for complete transmission at steady state (i.e., at steady state, the amplitude or intensity of the rejected optical signal energy is essentially zero); however, in other examples, the optical resonators may be tuned such that at steady state each of the transmitted optical signal energy and the rejected optical signal energy has a non-zero amplitude/intensity.

In FIG. 3, at point 308 the first optical resonator 102 is in the steady-state condition where a constant intensity of the corresponding transmitted output optical signal energy emerges. While shown in FIG. 3 as being at an intensity level of 0 when the first optical resonator 102 is in the steady state condition, it is appreciated that as discussed above, the corresponding rejected output optical signal energy may have a non-zero intensity level during the steady-state condition. At point 302 a phase transition occurs in the arriving free-space optical signal, temporarily disrupting the steady-state and causing a change in the intensity of the transmitted output optical signal energy and a change in the intensity of the rejected output optical signal energy.

In FIG. 3, the transmitted output optical signal energy is shown as having a decrease in intensity, and the rejected output optical signal energy is shown as having an increase in intensity. However, as discussed above, in other examples, the opposite may occur. During successive reflections of the received free-space optical signal inside the first optical resonator 102, resonance is re-established and the transmitted output optical signal energy increases (or decreases) until a steady intensity of light emerges when the first optical resonator 102 has returned to the steady-state condition. Also during the successive reflections of the received free-space optical signal inside the first optical resonator 102, the rejected output optical signal energy decreases (or increases) until a steady intensity of the rejected output optical signal energy emerges.

As illustrated in FIG. 3, the intensity change in the rejected output optical signal energy may lead the intensity change in the transmitted output optical signal energy. For instance, FIG. 3 shows the increase in the trace 306 temporally occurring before the decrease in the trace 304. Accordingly, in some examples, the rejected output optical signal energy may be used as a trigger to initiate detection operations corresponding to the transmitted output optical signal energy. For instance, a detected change (e.g., increase or decrease) in the intensity of the rejected output optical signal energy may be used as a trigger for initiating detection operations of the detector 118 illustrated in FIG. 1.

Use of the rejected output optical signal energy as a trigger may decrease the sampling requirements and memory requirements of the corresponding optical receiver (e.g., optical receiver 100 or optical receiver 200). In other examples, a detected intensity change in the rejected output optical signal energy may be used to validate a detected intensity change in the transmitted output optical signal energy. For instance, the optical receivers discussed herein may correlate a variation (e.g., phase, frequency or amplitude change) in the received free-space optical signal with a change in the intensity of the transmitted output optical signal energy only when an intensity change in the rejected output optical signal energy is also present. Such examples may help prevent the detection of false transitions in the received free-space optical signal. In certain examples, an average value of the rejected output optical signal energy can be used as a trigger threshold for detection of the transmitted optical signal energy. Although the above-discussed examples use the rejected output optical signal energy as a trigger for detecting/measuring the transmitted output optical signal energy, in other examples, the opposite arrangement can be implemented, namely, that the transmitted output optical signal energy, or an average value thereof, may be used as a trigger or detection threshold for the detection/measurement of the rejected output optical signal energy. The average value of either the transmitted output optical signal energy or the rejected output optical signal energy may also be used to determine the tuning of the resonance condition of the optical resonator, as the resonance condition may alter with changes in the wavelength of the incoming optical signal or other changing conditions.

As discussed, in many examples, the optical receivers 100, 200 may include processing circuitry, or may be coupled to processing circuitry. While in one example, the processing circuitry may be included within one or more of the detectors 118, 120, 208, 210 illustrated in FIG. 1 or FIG. 2, or the alignment system 122 illustrated in FIG. 1, in various other examples, the optical receivers 100, 200 and/or alignment system 122 may include communication circuitry (e.g., a transceiver) that communicates information to remote processing circuitry.

The processing circuitry may be configured to detect one or more changes in output optical signal energy intensity to determine the phase, frequency, or amplitude variations (modulations) in the arriving free-space optical signal. With regards to the optical receiver 100 of FIG. 1, the processing circuitry may further control the operation of the alignment system 122 to displace (e.g., rotate) the optical receiver 100. The processing circuitry may be signal processing circuitry, and may be implemented with one or more specialized hardware components or one or more specialized software components. For instance, the processing circuitry may be implemented as one of, or a combination of, analog circuitry or digital circuitry. The processing circuitry may be composed of an array of logic blocks arranged to perform one or more of the corresponding signal processing operations described herein. In particular, the processing circuitry may be implemented by an array of transistors arranged in an integrated circuit that provides a performance and power consumption similar to an ASIC (application-specific integrated circuit) or an FPGA (field-programmable gate array). In other examples, components of the processing circuitry may be implemented as one or more microprocessors executing software instructions (e.g., predefined routines). In particular, the software instructions may include digital signal processing (DSP) instructions. One example of a processing system for executing such predefined routines is described herein with reference to FIG. 4.

Figure 4:
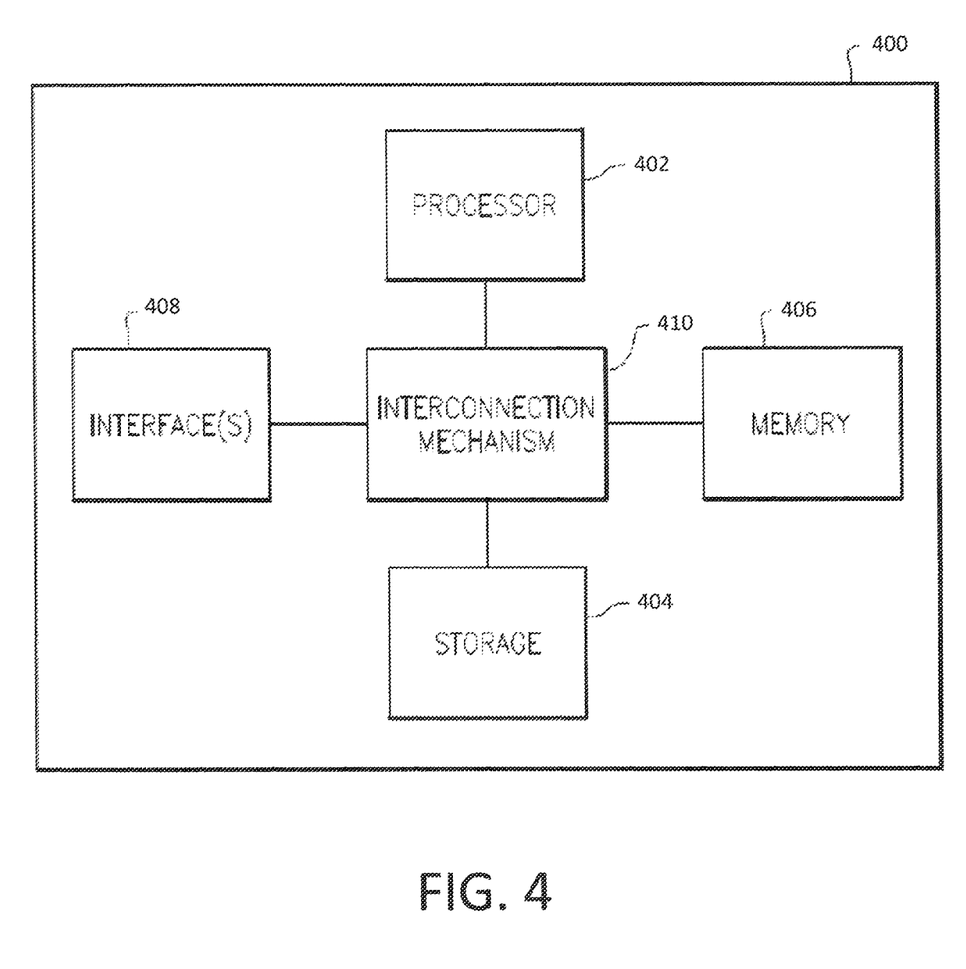
FIG. 4 is a functional block diagram of one example of a processing system that may be used in an optical receiver according to aspects of the present invention.

FIG. 4 illustrates one example of a processing system 400 that may be included within the optical receiver 100 illustrated in FIG. 1, or the optical receiver 200 illustrated in FIG. 2. The processing system 400 may include a processor 402, data storage 404, a memory 406, and one or more interfaces 408, such as a system interface and/or a user interface. While not explicitly illustrated in FIG. 4, in certain examples the processing system 400 may be coupled to a power source. The power source may deliver power to one or more components of the processing system 400, as well as other components of the optical receiver 100.

In FIG. 4, the processor 402 is coupled to the data storage 404, memory 406, and the various interfaces 408. The memory 406 stores programs (e.g., sequences of instructions coded to be executable by the processor 402) and data during operation of the processing system 400. Thus, the memory 406 may be a relatively high performance, volatile, random access memory such as a dynamic random access memory ("DRAM") or static memory ("SRAM"). However, the memory 406 may include any device for storing data, such as a disk drive or other nonvolatile storage device. Various examples may organize the memory 406 into particularized and, in some cases, unique structures to perform the functions disclosed herein. These data structures may be sized and organized to store values for particular data and types of data.

The data storage 404 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 402 to perform any of the functions described herein.

In various examples, the processing system 400 includes several interface components 408, such as a system interface and/or a user interface. Each of the interface components 408 is configured to exchange, e.g., send or receive, data with other components of the processing system 400 (and/or associated optical receiver), or other devices in communication with the processing system 400. According to various examples, the interface components 408 may include hardware components, software components, or a combination of hardware and software components. In certain examples, components of the system interface couples the processor 402 to one or more other components of the optical receiver 100 shown in FIG. 1 or one or more other components of the optical receiver 200 shown in FIG. 2. The system interface may provide one or more control signals to any such components and may manage the operation of such components, as described above.

A user interface may include hardware and/or software components that allow a corresponding optical receiver in which the processing system 400 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the processing system 400. Data received at the various interfaces may be provided to the processor 402, as illustrated in FIG. 4. Communication coupling (e.g., shown interconnection mechanism 410) between the processor 402, memory 406, data storage 404, and interface(s) 408 may be implemented as one or more physical busses in conformance with standard, proprietary, or specialized computing bus technologies.

The processor 402 performs a series of routines (e.g., digital signal processing instructions) that result in manipulated data that is stored in and retrieved from the data storage 404, as discussed above. In various examples, the series of instructions result in interpretation of the outputs from an optical resonator, as discussed above. Such instructions may correspond to commands for interpreting peaks and troughs of such output signals to determine phase, amplitude, and/or frequency changes, and recovering information therefrom.

The processor 402 may be any type of processor, multi-processor or controller. For instance, the processor may include a processor manufactured by INTEL, AMD, MOTOROLA, or FREESCALE. In some examples, the processor 402 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Examples of specific implementations are provided herein for illustrative purposes only and are not intended to be limiting. Accordingly, the foregoing description and drawings are by way of example only, and the scope of the invention should be determined from proper construction of the appended claims, and their equivalents.

What is claimed is:

1. An optical receiver comprising:
a polarizing beamsplitter positioned along an optical axis to receive a free-space optical signal, the polarizing beamsplitter being configured to direct light having a first polarization along a first optical path and to direct light having a second polarization, orthogonal to the first polarization, along a second optical path;
a first detector positioned along the first optical path to receive the free-space optical signal when the free-space optical signal has the first polarization;
an alignment system configured to rotate either the optical receiver about the optical axis or a polarization of the free-space optical signal such that the free-space optical signal is directed along the second optical path;
a faraday rotator positioned along the second optical path and configured to rotate the polarization of the free-space optical signal;
an optical resonator configured to receive the free-space optical signal from the faraday rotator and to accumulate resonant optical signal energy, the optical resonator being configured to transmit first output optical signal energy from the optical resonator and reject second output optical signal energy from the optical resonator, wherein in response to a variation in the free-space optical signal corresponding to a modulation of the free-space optical signal, the optical resonator is configured to disrupt the first output optical signal energy and the second output optical signal energy to convert the modulation of the free-space optical signal into an intensity modulation of the first output optical signal energy and the second output optical signal energy;
a second detector positioned to receive the first output optical signal energy and detect the intensity modulation of the first output optical signal energy; and
a third detector positioned to receive the second output optical signal energy.

2. The optical receiver of claim 1, wherein the faraday rotator is further positioned to receive the second output optical signal energy from the optical resonator, and further configured to rotate a polarization of the second output optical signal energy.

3. The optical receiver of claim 2, wherein the faraday rotator is further configured to direct the second output optical signal energy to the polarizing beamsplitter, and wherein the polarizing beamsplitter is configured to direct the second output optical signal energy to the third detector.

4. The optical receiver of claim 3, wherein the faraday rotator is configured to rotate the polarization of the free-space optical signal by 45 degrees, and configured to rotate the polarization of the second output optical signal energy by 45 degrees.

5. The optical receiver of claim 1, wherein the optical resonator includes a first semi-reflective surface and a second semi-reflective surface and is configured to accumulate the resonant optical signal energy by reflecting at least a portion of the free-space optical signal between the first and second semi-reflective surfaces.

6. The optical receiver of claim 1, wherein the free-space optical signal is one of a phase-modulated optical signal, a frequency-modulated optical signal, and an amplitude-modulated optical signal, and wherein the variation corresponds to a respective phase, frequency, or amplitude change in the free-space optical signal.

7. The optical receiver of claim 1, wherein the optical receiver is configured to use an average value of the second output optical signal energy detected by the third detector as a trigger threshold for detection of the intensity modulation of the first output optical signal energy by the second detector.

8. An optical receiver comprising:
a first polarizing beamsplitter configured to receive a free-space optical signal and split the free-space optical signal into a first polarization component having a first polarization and a second polarization component having a second polarization, the first polarization being orthogonal to the second polarization, wherein the first polarizing beamsplitter is configured to direct the first polarization component along a first optical path and direct the second polarization component along a second optical path;
a first faraday rotator positioned along the second optical path and configured to receive the second polarization component, the first faraday rotator being configured to rotate the second polarization of the second polarization component;
a first optical resonator configured to receive the second polarization component from the first faraday rotator and to accumulate first resonant optical signal energy, the first optical resonator being configured to transmit first output optical signal energy and reject second output optical signal energy, wherein in response to a variation in the second polarization component corresponding to a modulation of the free-space optical signal, the first optical resonator is configured to disrupt the first output optical signal energy and the second output optical signal energy to convert the variation in the second polarization component to an intensity modulation of the first output optical signal energy and the second output optical signal energy
a first detector positioned to receive the first output optical signal energy and detect the variation in the second polarization component;

a second detector positioned to receive the second output optical signal energy;

a second faraday rotator configured to receive the first polarization component and rotate the first polarization of the first polarization component;

a second optical resonator configured to receive the first polarization component from the second faraday rotator and to accumulate second resonant optical signal energy, the second optical resonator being configured to transmit third output optical signal energy and reject fourth output optical signal energy, wherein in response to a variation in the first polarization component corresponding to the modulation of the free-space optical signal, the second optical resonator is configured to disrupt the third output optical signal energy and the fourth output optical signal energy to convert the variation in the first polarization component into an intensity modulation of the third output optical signal energy and the fourth output optical signal energy;

a third detector positioned to receive the third output optical signal energy and detect the variation in the first polarization component; and a fourth detector positioned to receive the fourth output optical signal energy.

9. The optical receiver of claim 8, further comprising a second polarizing beamsplitter positioned along the first optical path to receive the first polarization component, wherein the second polarizing beamsplitter is configured to direct the first polarization component to the second faraday rotator.

10. The optical receiver of claim 9, wherein the first faraday rotator is further positioned to receive the second output optical signal energy from the first optical resonator, and further configured to rotate a polarization of the second output optical signal energy.

11. The optical receiver of claim 10, wherein the first faraday rotator is further configured to direct the second output optical signal energy to the first polarizing beamsplitter, and wherein the first polarizing beamsplitter is configured to direct the second output optical signal energy to the second detector.

12. The optical receiver of claim 11, wherein the second faraday rotator is further positioned to receive the fourth output optical signal energy from the second optical resonator, wherein the second faraday rotator is further configured to rotate a polarization of the fourth output optical signal energy, and wherein the second polarizing beamsplitter is configured to direct the fourth output optical signal energy to the fourth detector.

13. The optical receiver of claim 12, wherein the first faraday rotator is configured to rotate the second polarization of the second polarization component by 45 degrees, and configured to rotate the polarization of the second output optical signal energy by 45 degrees.

14. The optical receiver of claim 8, wherein the first optical resonator includes a first semi-reflective surface and a second semi-reflective surface and is configured to accumulate the first resonant optical signal energy by reflecting at least a portion of the second polarization component between the first and second semi-reflective surfaces.

15. The optical receiver of claim 8, wherein the free-space optical signal is one of a phase-modulated optical signal, a frequency-modulated optical signal, and an amplitude-modulated optical signal, and wherein the variation in the first polarization component or the variation in the second polarization component corresponds to a respective phase, frequency, or amplitude change in the free-space optical signal.

16. A method of operating an optical receiver, the method comprising:

receiving, along an optical axis at a polarizing beamsplitter, a free-space optical signal having a polarization;

at the polarizing beamsplitter, directing the free-space optical signal along a first optical path when the polarization of the free-space optical signal is a first polarization, and directing the free-space optical signal along a second optical path when the polarization of the free-space optical signal is a second polarization that is orthogonal to the first polarization;

receiving the free-space optical signal at a first detector positioned along the first optical path when polarization of the free-space optical signal is the first polarization;

rotating either the optical receiver about the optical axis or a polarization of the free-space optical signal such that the free-space optical signal is directed along the second optical path;

rotating the polarization of the free-space optical signal at a faraday rotator positioned along the second optical path;

receiving the free-space optical signal from the faraday rotator at an optical resonator and accumulating resonant optical signal energy within the optical resonator;

disrupting first output optical signal energy emitted from the optical resonator and second output optical signal energy rejected from the optical resonator in response to a variation in the free-space optical signal corresponding to a modulation of the free-space optical signal to convert the modulation of the free-space optical signal into an intensity modulation of the first and second output optical signal energies;

receiving the first output optical signal energy at a second detector, and detecting the intensity modulation of the first output optical signal energy; and receiving the second output optical signal energy at a third detector.

17. The method of claim 16, further comprising:

receiving the second output optical signal energy rejected from the optical resonator at the faraday rotator;

rotating a polarization of the second output optical signal energy and directing the second output optical signal energy to the polarizing beamsplitter with the faraday rotator; and directing the second output optical signal energy to the third detector with the polarizing beamsplitter.

18. The method of claim 16, wherein accumulating the resonant optical signal energy within the optical resonator includes reflecting at least a portion of the free-space optical signal between a first semi-reflective surface and a second semi-reflective surface.

19. The method of claim 16, wherein the free-space optical signal is one of a phase-modulated optical signal, a frequency-modulated optical signal, and an amplitude-modulated optical signal, and wherein the variation corresponds to a respective phase, frequency, or amplitude change in the free-space optical signal.

20. The method of claim 16, further comprising:

detecting an average value of the second output optical signal energy; and using the average value of the second output optical signal energy as a trigger threshold for detection of the intensity modulation of the first output optical signal energy.

* * * * *